Figure 1:
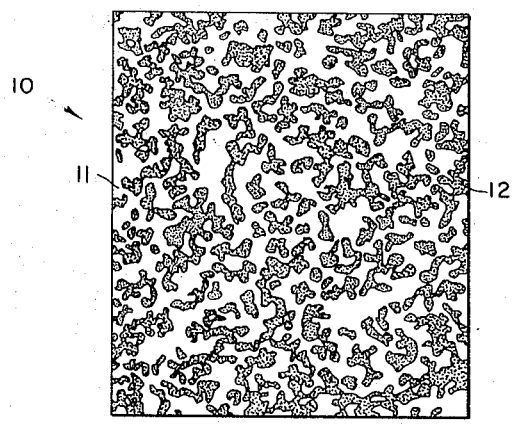

INVENTORS
RICHARD H. KROCK
EDWARD J. ZDANUK

ATTORNEY

United States Patent Office 3,303,026
Patented Feb. 7, 1967

3,303,026
VACUUM INFILTRATING OF TUNGSTEN POWDER BODIES WITH COPPER-TITANIUM ALLOYS
Edward J. Zdanuk, Lexington, and Richard H. Krock, Peabody, Mass., assignors to P. R. Mallory & Co. Inc., Indianapolis, Ind., a corporation of Delaware
Filed Mar. 11, 1966, Ser. No. 533,579
9 Claims. (Cl. 75—208)

The present invention relates to powder metallurgy and more particularly to improved means and methods of providing composite materials for use as an electrical contact material.

It was found that using vacuum infiltration techniques, a copper-titanium alloy, titanium sandwiched between copper and a tungsten powder body subsequently heated to form a copper-titanium alloy, a tungsten powder body coated with titanium by electrolytic or vapor phase plating, and the like wet individual particles of the tungsten powder body so as to allow infiltration of the powder body with copper-titanium. The resultant composite body was found to have a high concentration of titanium in the interface region between the tungsten particles and the copper-titanium alloy thereby raising the overall electrical conductivity of the copper-titanium alloy matrix. The use of vacuum infiltration techniques also decreases the volume of hydrogen present in the resultant tungsten-copper-titanium composite by more than an order and decreases the volume of all gaseous components by several orders.

Although complete and substantially instantaneous infiltration of copper into sintered tungsten bodies is conveniently carried out in an atmosphere of hydrogen, a copper melt shows no penetration into tungsten power bodies in a vacuum atmosphere using comparable time-temperature treatments and using standard metallurgical procedures. In carrying out the present invention, it was found that subjecting the tungsten powder body and a contacting copper-titanium alloy to a vacuum infiltration process, the copper-titanium alloy was absorbed into the tungsten body by capillary attraction. It is thought that the titanium promotes wetting of the tungsten particles by the copper-titanium alloy.

Tungsten is used in electrical contact materials because of its inherent characteristics of hardness and of resistance to arcing which reduce pitting of the tungsten contact material. However, pure tungsten contact material possesses high electrical resistance which lowers the efficiency and reliability of the tungsten contact material.

It has been suggested that a composite of tungsten-copper used as an electrical contact material would make advantageous use of the several outstanding characteristics of both metals. In the composite, the copper provides the current carrying capability and thermal conductivity while the tungsten contributes hardness, resistance to arc erosion, and superior anti-weld properties. In order to utilize the aforementioned characteristics of the copper and the tungsten, it is necessary to fabricate the metal into a tungsten-copper composite.

Copper and tungsten are mutually insoluble and form no alloys in the metallurgical sense, but mixtures of the two metals are usually referred to as alloys but are, technically speaking, composites. Composites of tungsten-copper may be prepared by pressing the mixed metal powders to the required shape in dies, and subsequently sintering in a hydrogen atmosphere above the melting point temperature of the copper, preferably between 1250° and 1350° centigrade. The hydrogen acts as a flux and the molten copper wets the tungsten particles and cements them together. Another method which provides a harder resultant body consists of first pressing and sintering the tungsten powder so as to form a coherent but porous body, which is then heated at a temperature of about 1200° C. to 1300° C. in a hydrogen atmosphere and in contact with molten copper. The copper is absorbed into the pores of the tungsten powder body by capillary attraction. The copper infiltrant imparts strength and ductility to the tungsten powder body and also provides the resultant body with higher current carrying capability and thermal conductivity. However, using standard metallurgical procedures, a copper melt shows no penetration into the tungsten powder body in a vacuum. It is thought that the lack of penetration of the copper into the tungsten powder body is due to the unfavorable surface energies that are present in the vacuum.

If there is no solubility between the metals as is the situation between tungsten and copper, and if the wetting is poor, an auxiliary agent for influencing the surface energies in the desired direction is required.

It was found that by utilizing small amounts of titanium and by using vacuum infiltration techniques a melt of copper-titanium completely infiltrated the tungsten powder body. It is thought the titanium either raises the surface energies of the melt or of the solid, or lowers the surface energy of the interface between the melt and the solid thereby favoring infiltration of the melt into the tungsten powder body. It is thought the vacuum serves the dual purpose of allowing penetration of the copper-titanium melt into the tungsten powder body and of significantly decreasing the volume of all gases present. However, the resultant tungsten-copper-titanium contact material must contain a low volume of gas before the material is acceptable for application in vacuum environments.

Therefore, it is an object of the present invention to provide a composite material suitable for use as a contact material in vacuum electrical switching devices.

Another object of the present invention is to provide a composite material of tungsten particles in a matrix of copper-titanium for use as an electrical contact material wherein the concentration of titanium in the tungsten interface region is much higher than the concentration of titanium between the tungsten particles thereby raising the overall electrical conductivity of the copper-titanium alloy matrix.

Yet another object of the present invention is to provide a means and method of vacuum infiltrating a refractory material with an electrically conducting material thereby providing a composite contact material which is low in gas content and low in material which may be converted to gas during operation of the contact.

Yet still another object of the present invention is to provide means and methods of using a copper-titanium alloy as infiltration stock for tungsten powder bodies so as to allow complete vacuum infiltration of the tungsten powder body thereby providing a composite contact material having integrally joined tungsten-copper-titanium materials.

A further object of the present invention is to provide means and methods of fabricating a composite contact material using vacuum infiltration techniques, the composite contact material having high electrical and thermal conductivity, combined with low erosion under arcing and low deformation under pressure environments.

Another object of the present invention is to provide an alloy which includes an agent that wets the tungsten, that is ductile, that has high electrical and thermal conductivity, and includes a melting point that is lower than tungsten.

The present invention, in another of its aspects relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and in the appended claims.

In the drawings:

FIGURE 1 is a photomicrograph of about 500 magnifications of a tungsten-copper-titanium composite contact material showing a sintered tungsten specimen completely vacuum infiltrated with a copper-titanium alloy containing about 0.5 percent by weight, titanium. The infiltration was carried out at 1250° C. for 1 hour at a pressure of $10^{-5}$ torr.

Figure 2:
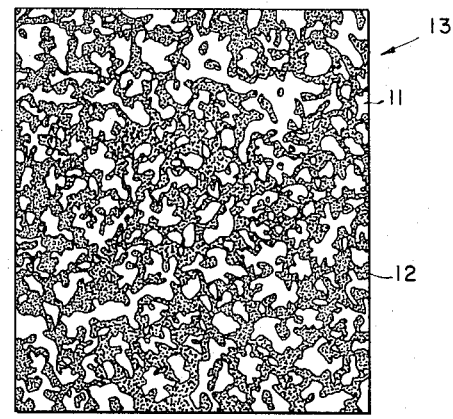

FIGURE 2 is a photomicrograph of 500 magnifications of a tungsten-copper-titanium composite contact material illustrating a compacted tungsten specimen completely vacuum infiltrated with a copper-titanium alloy containing about 0.5 percent, by weight, titanium. FIGURE 2 also shows a greater dispersion of the tungsten powders in the copper-titanium matrix than is shown in FIGURE 1 using comparable sintering time-temperature.

Figure 3:
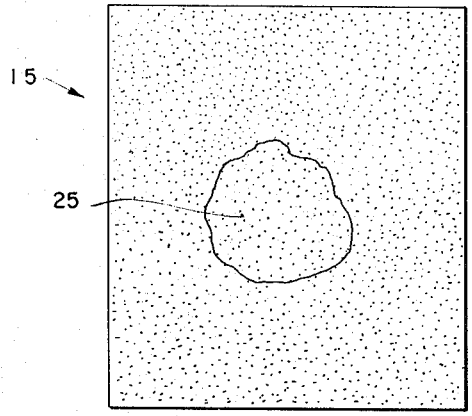

FIGURE 3 is an enlarged cross-sectional view of a tungsten-copper-titanium composite contact material showing a sintered tungsten specimen that is about 90 percent vacuum infiltrated with a copper-titanium alloy containing about 0.2 percent, by weight, titanium using the temperature treatments used in FIGURES 1 and 2, but lessening the time of the temperature treatment to 30 minutes.

Figure 4:
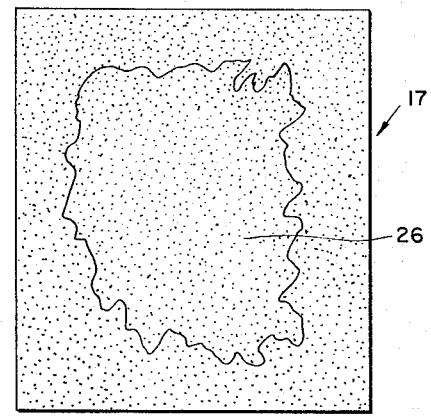

FIGURE 4 is an enlarged cross-sectional view of a tungsten-copper-titanium composite contact material illustrating a sintered tungsten specimen about 30 to 40 percent vacuum infiltrated with a copper-titanium alloy containing about 0.05 percent, by weight, titanium using the temperature treatments used in FIGURES 1 and 2 but reducing the length of the temperature treatment to 20 minutes.

Figure 5:
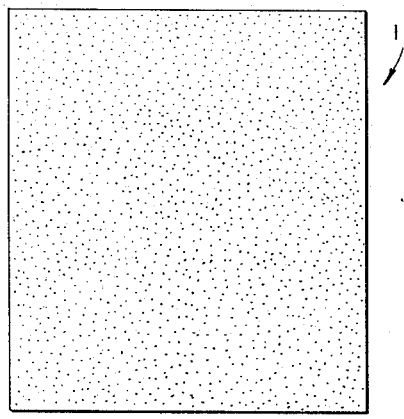

FIGURE 5 is an enlarged cross-sectional view of a tungsten-copper-titanium composite contact material illustrating a sintered tungsten specimen that was completely vacuum infiltrated by the copper-titanium alloy containing about 0.05 percent, by weight, titanium by subjecting the specimen to a temperature of 1450° C. for the time duration of FIGURE 4.

Generally speaking, the means and methods of the present invention relate to an electrical contact material for use in a switching device such as, for example, in a vacuum electrical power switching means. The contact material consists of a tungsten body completely vacuum infiltrated by a copper-titanium alloy. The copper-titanium alloy consists of 0.5 to 0.05 percent, by weight, titanium, the remainder copper.

The method of making a tungsten body infiltrated with an alloy of copper comprises the steps of compacting powdered tungsten particles into a desired body shape. The tungsten body is contacted with a copper-titanium alloy which when heated above its melting point makes use of its ability as an agent for wetting the tungsten particles. The tungsten body and the contacting copper alloy are placed in a vacuum atmosphere and heated so as to completely vacuum infiltrate the tungsten body with the copper alloy by capillary attraction thereby forming a composite contact material.

More particularly, the means and methods of the present invention relate to fabricating a tungsten body infiltrated with an alloy of copper-titanium for use as an electrical contact in vacuum environments. The tungsten powder has a particle size ranging between 1 and 10 microns and is compacted under pressure ranging from 20 to 35 tons per square inch into a desired body shape. The tungsten body may be presintered in a hydrogen atmosphere at about 1250° centigrade for about 10 minutes. The surfaces of the sintered tungsten body are contacted with an alloy of copper-titanium. The copper-titanium alloy consisted of 0.05 to 0.5 percent, by weight, titanium, the remainder copper. The titanium is used to promote the wetting of the tungsten particles by the copper-titanium alloy. The tungsten body and the contacting copper-titanium alloy are placed in a vacuum atmosphere having a pressure of about $10^{-5}$ torr and heated at a temperature of between 1250° and 1450° centigrade for a time duration of between 20 minutes and 60 minutes. The tungsten body is completely vacuum infiltrated with the copper-titanium alloy thereby forming a tungsten-copper-titanium composite for use as a contact material in vacuum environments.

In carrying out the present invention, it was found for a tungsten-copper system, an alloy of copper-titanium having small amounts of titanium when brought into contact with the tungsten powder body in a heated vacuum environment resulted in the copper-titanium completely infiltrating the tungsten powder body and forming a dense composite material. It is thought that the small amount of titanium is sufficient to either raise the surface energies of the melt of copper-titanium or of the tungsten particles or lower the surface energy of the interface between the melt and the solid.

The resultant composite is dense and has high electrical and thermal conductivity combined with a high resistance to deformation under pressure.

In forming the tungsten powder body, a suitable mold is utilized to form the tungsten powder into a desired shape. The size of the particles of tungsten may vary in accordance with the desired density of the composite contact material and with the desired pore size distribution of the composite contact material. For illustrative purposes, tungsten powder having a particle size of about 1 micron to 10 microns is utilized. However, it should be understood that tungsten powder having a larger or a smaller particle size may be used.

The tungsten particles are compacted within the confines of a suitable mold by a compacting pressure ranging between 20 and 35 tons per square inch thereby forming a porous tungsten body. If it is desired to further strengthen the tungsten body prior to infiltration and/or provide a composite having a higher tungsten content, the tungsten body may be sintered in an atmosphere of hydrogen at a temperature of about 1250° C. for a time duration of about 10 minutes. FIGURE 1 shows a composite structure wherein the tungsten compact was presintered. After the preparatory treatment is completed, the strength of the tungsten compact is materially increased, and the compact can be handled readily. Very little grain growth takes place during the presinter treatment, and the increase in strength of the compact may be due to the reduction of the surface film of oxide on the individual tungsten particles, the reduced metal acting as a cement which binds the tungsten particles together.

It should be pointed out that the presinter of the tungsten compact in the hydrogen atmosphere is not a necessary prerequisite to the successful infiltration of the tungsten powder body with the copper-titanium alloy. FIGURE 2 shows a tungsten powder body which was not presintered but is completely vacuum infiltrated with the copper-titanium alloy.

The dispersion differential of the tungsten particles between FIGURE 1 and FIGURE 2 should be noted. The dispersion of the tungsten particles in FIGURE 2 is greater than the dispersion of the tungsten particles of FIGURE 1 due only to the fact that the tungsten specimen of FIGURE 1 was subjected to a presintering step whereas the specimen of FIGURE 2 was not.

The tungsten specimen, presintered or not, is placed in a vacuum having a pressure of $10^{-5}$ torr or less and contacted with a copper-titanium alloy containing about 0.5 percent, by weight, or less of titanium. The tungsten specimen and the contacting copper-titanium alloy is heated to a temperature of between about 1200° C. to 1450° C. The range of temperatures exceeds the 1085° C. melting point temperature of the copper-titanium alloy but is below the 3410° C. melting point temperature of tungsten.

A chemical analysis of the resultant composite body showed that vacuum processing decreases the volume of hydrogen by more than an order and decreases the volume of other gaseous components by several orders.

An electron probe analysis of the region between tungsten particles composed of the copper-titanium alloy showed a segregation or a high concentration of titanium in the interface region between the tungsten and copper-titanium alloy. This would explain how relatively small additions of titanium can remain highly active during the extensive penetration of the tungsten body by the infiltrant.

Due to the gradation in titanium concentration in the copper-titanium alloy, which produces a much higher concentration of titanium in the tungsten interface region than the nominal concentration in the infiltration stock, the bulk of the region between the tungsten particles contains a much lower concentration of titanium than that used in the infiltration stock. Since titanium in solid solution lowers the conductivity of copper, the titanium segregation has a dual advantage, that is, in addition to promoting the wetting and infiltration in a vacuum environment, the segregation also raises the overall electrical conductivity of the infiltration alloy above that which would be expected from the nominal concentration of the infiltration stock.

Referring to the drawings, FIGURE 1 illustrates a tungsten-copper-titanium composite 10 consisting of a sintered porous compact of tungsten particles 11 which has been completely infiltrated by a coherent network of copper-titanium 12. The metal surfaces of the copper-titanium mixture are integrally bonded with the tungsten particles. The copper-titanium alloy used to contact the tungsten powder body prior to vacuum infiltration contains about 0.5 percent, by weight, titanium. During vacuum infiltration, the porous tungsten body and the contacting alloy were subjected to a temperature of about 1250° C. for about 60 minutes at a pressure of $10^{-5}$ torr, or less.

FIGURE 2 shows a tungsten-copper-titanium composite 13 similar to that of FIGURE 1 except that the initial tungsten compact was not sintered prior to the vacuum infiltration.

The dispersion differential of the tungsten particles between FIGURE 1 and FIGURE 2 should be noted. The dispersion of the tungsten particles in FIGURE 2 is greater than the dispersion of the tungsten particles in FIGURE 1 due only to the fact that the tungsten specimen of FIGURE 1 was subjected to a presintering treatment.

FIGURE 3 illustrates a tungsten-copper-titanium composite 14 consisting of a sintered porous compact of tungsten particles about 90 percent infiltrated by a coherent network of a copper-titanium mixture. The area 25 represents void spaces among the tungsten particles, that is, an area not infiltrated with copper-titanium. The metal surfaces of the copper-titanium mixture are integrally bonded to the surfaces of the tungsten particles. The copper-titanium alloy used to contact the porous tungsten body prior to vacuum infiltration contains about 0.2 percent, by weight, titanium. During vacuum infiltration, the porous tungsten body and the contacting alloy were subjected to a temperature of about 1250° C. for about 30 minutes at a vacuum pressure of $10^{-5}$ torr, or less.

FIGURE 4 shows a tungsten-copper-titanium composite 17 consisting of a sintered porous compact of tungsten particles about 30 to 40 percent vacuum infiltrated by a coherent network of a copper-titanium alloy. The area 26 represents void spaces among the tungsten particles, that is, an area not infiltrated with copper-titanium. The metal surfaces of the copper-titanium mixture are integrally bonded with the surfaces of the tungsten particles. The copper-titanium alloy used to contact the porous tungsten body prior to vacuum infiltration contains about 0.05 percent, by weight, titanium. During vacuum infiltration, the porous tungsten body and the contacting alloy were subjected to a temperature of about 1250° C. for about 20 minutes at a vacuum pressure of $10^{-5}$ torr or less.

FIGURE 5 illustrates a tungsten-copper-titanium composite 19 completely vacuum infiltrated with the copper-titanium alloy. The alloy contained about 0.05 percent, by weight, of titanium, like the alloy used to produce the composite of FIGURE 4. The porous tungsten body and the contacting alloy were subjected to a temperature of about 1450° C. for about 20 minutes at a vacuum pressure of $10^{-5}$ torr or less.

The tungsten-copper-titanium composites illustrated in FIGURES 1 to 5 illustrate that a decreasing amount of infiltration into the tungsten body takes place with a decreasing amount of titanium present in the copper-titanium alloy and/or a decreasing time-temperature treatment. FIGURE 5 shows that the reduced amount of titanium in the copper-titanium alloy and/or decreased heating time can be compensated for by increasing the heating temperature to which the tungsten body and the contacting copper-titanium alloy are subjected.

The following Examples 1 to 5 are illustrative of the preparation of a tungsten-copper-titanium contact material by vacuum infiltration of a tungsten powder body with a copper-titanium alloy.

Example 1

A sintered tungsten body completely vacuum infiltrated by an alloy of copper-titanium, the alloy containing about 0.5 percent, by weight, titanium, the remainder copper.

Powdered tungsten having a particle size of about 1 to 10 microns was pressed by any suitable means such as by an automatic press at about 20 tons per square inch to provide a green compact sturdy enough to be handled. The green compact was presintered at about 1250° C. for about 10 minutes in an atmosphere of hydrogen so as to form a skeleton type structure. The presintering of the compact serves to increase the strength of the compact by cementing the tungsten particles each to the other thereby binding them together. The sintered porous compact is contacted with an alloy of copper-titanium having a titanium content of about 0.5 percent, by weight, the remainder copper. The sintered tungsten compact and the contacting alloy of copper-titanium are placed in a vacuum atmosphere having a pressure of about $10^{-5}$ or less and are heated at a temperature of about 1250° C. for a time duration of about 1 hour. The porous tungsten body was found to be completely vacuum infiltrated by the copper-titanium mixture. The resultant tungsten-copper-titanium composite is illustrated in FIGURE 1 of the drawing.

Example 2

A green tungsten powder body completely vacuum infiltrated by an alloy of copper-titanium, the alloy of copper-titanium containing about 0.5 percent, by weight, titanium, the remainder copper.

Powdered tungsten having a particle size of about 1 micron to about 10 microns was pressed by any suitable means such as by an automatic press at about 20 tons per square inch to provide a green compact sturdy enough to be handled. The porous green compact is contacted with an alloy of copper-titanium having a titanium content of about 0.5 percent, by weight titanium, the remainder copper. The green tungsten compact and the contacting alloy of copper-titanium are placed in a vacuum atmosphere having a pressure of $10^{-5}$ torr or less and are heated at about 1250° centigrade for about 1 hour. The porous tungsten body was found to be completely infiltrated by the copper-titanium alloy. The resultant tungsten-copper-titanium composite is illustrated in FIGURE 2 of the drawings.

The dispersion differential of the tungsten particles should be noted between the sintered tungsten specimen of FIGURE 1 and the green compact tungsten specimen and FIGURE 2. The dispersion of the tungsten particles of FIGURE 2 is greater than the dispersion of the tungsten particles of FIGURE 1.

*Example 3*

A sintered tungsten body about 90 percent vacuum infiltrated by an alloy of copper-titanium, the alloy of copper-titanium containing about 0.2 percent, by weight, titanium, the remainder copper.

Powdered tungsten having a particle size of about 1 micron to about 10 microns was pressed by any suitable means such as by an automatic press at about 20 tons per square inch to provide a green compact sturdy enough to be handled. The green compact was sintered at a temperature of about 1250° centigrade for about 10 minutes in a hydrogen atmosphere. The sintered porous tungsten compact is contacted with an alloy of about 0.2 percent, by weight, titanium, the remainder copper. The sintered tungsten compact and the contacting alloy of copper-titanium are placed in a vacuum atmosphere having a pressure of $10^{-5}$ torr or less and heated at about 1250° centigrade for about 30 minutes. The porous tungsten body was found to be 90 percent infiltrated by the copper-titanium alloy. The resultant tungsten-copper-titanium is illustrated in FIGURE 3 of the drawings.

It should be noted that a decrease in the amount of titanium in the copper-titanium alloy and/or infiltration time results in porous areas remaining in the tungsten specimen. The pores can be closed by increasing the infiltration temperature and/or the infiltration time.

*Example 4*

A sintered tungsten body about 30 to 40 percent vacuum infiltrated by an alloy of copper-titanium, the alloy of copper-titanium containing about 0.05 percent, by weight, titanium, the remainder copper.

Powdered tungsten having a particle size of about 1 micron to about 10 microns was pressed by any suitable means such as by an automatic press at about 20 tons per square inch to provide a green compact sturdy enough to be handled. The green compact was sintered at about 1250° centigrade for about 10 minutes in a hydrogen atmosphere. The sintered porous tungsten compact was contacted with an alloy containing about 0.05 percent, by weight, titanium, the remainder copper. The sintered tungsten compact and the contacting alloy of copper-titanium were placed in a vacuum atmosphere having a pressure of $10^{-5}$ torr or less and were heated at about 1250° centigrade for about 20 minutes. The porous tungsten body was found to be 30 to 40 percent infiltrated by the copper-titanium alloy. The resultant tungsten-copper-titanium composite is illustrated in FIGURE 4 of the drawings. The pores can be closed by increasing the infiltration temperature and/or the infiltration time.

*Example 5*

A sintered tungsten body completely vacuum infiltrated by an alloy of copper-titanium, the alloy of copper-titanium containing about 0.05 percent, by weight, titanium, the remainder copper.

Powdered tungsten having a particle size of about 1 micron to about 10 microns was pressed by any suitable means such as by an automatic press at about 20 tons per square inch to provide a green compact sturdy enough to be handled. The green compact was sintered at a temperature of about 1250° centigrade for a time duration of about 10 minutes in a hydrogen atmosphere. The sintered porous tungsten compact was contacted with an alloy of about 0.05 percent, by weight, titanium, the remainder copper. The sintered tungsten compact and the contacting alloy of copper-titanium were placed in a vacuum atmosphere having a pressure of $10^{-5}$ torr or less and were heated at about 1450° centigrade for about 20 minutes so as to form a structure similar to FIGURE 2. The porous tungsten body was found to be completely vacuum infiltrated by the copper-titanium alloy by increasing the infiltration temperature over that recited in Example 4. The resultant tungsten-copper-titanium composite is illustrated in FIGURE 5 of the drawings.

It is thought that the tungsten powder body or the presintered tungsten body may be coated with titanium by electrolytic or vapor phase plating, impregnation of the coated body could be carried out successfully with essentially pure (unalloyed) copper. Vacuum impregnation will occur as long as titanium is at the boundary. The amount of plated titanium would be such that its composition would amount to 0.5 to 0.05 percent by weight of that of the amount of copper required to fill the voids.

The present invention is not intended to be limited to the disclosure herein, and changes and modifications may be made by those skilled in the art without departing from the spirit and the scope of the present invention. Such modifications and variations are considered to be within the purview and the scope of the present invention and the appended claims.

Having thus described our invention, we claim:

1. A method of making a tungsten powder body infiltrated with an alloy of copper for use as an electrical contact material in vacuum environments comprising the steps of compacting tungsten particles into a desired body shape; contacting the surfaces of the compacted tungsten body with copper and titanium, said titanium for promoting the wetting of said tungsten particles; placing said tungsten body and said contacting copper and titanium in a vacuum atmosphere; and heating said tungsten body and said contacting copper and titanium so as to completely vacuum infiltrate said tungsten body with an alloy of copper-titanium thereby forming a composite material for use as a contact material in a vacuum switching device.

2. The method according to claim 1 wherein said tungsten body is contacted with said titanium by electrolytic plating.

3. The method according to claim 1 wherein said tungsten body is contacted with said titanium by vapor phase plating.

4. The method according to claim 1 wherein said copper alloy consists of about 0.5 to 0.05 percent, by weight, titanium, the remainder copper.

5. The method according to claim 1 wherein said vacuum atmosphere has a pressure of not more than $10^{-5}$ torr.

6. The method according to claim 1 wherein said heating is to a temperature of between about 1250° C. and 1450° C. for a time duration of between about 20 minutes and 60 minutes.

7. The method according to claim 1 wherein the particle size of said tungsten is between about 1 to 10 microns.

8. The method according to claim 1 wherein the compacting pressure is about 20 tons per square inch.

9. The method according to claim 1 including the additional step of sintering said compacted tungsten body in a hydrogen atmosphere at a temperature of about 1250° C. for a time duration of about 10 minutes.

References Cited by the Examiner

UNITED STATES PATENTS

| | | | |
|---|---|---|---|
| 2,401,221 | 5/1946 | Bourne | 75—208 |
| 2,456,779 | 12/1948 | Goetzel | 29—182.1 |
| 2,612,443 | 9/1952 | Goetzel et al. | 75—200 |
| 2,797,300 | 6/1957 | Hawthorne | 75—164 |
| 2,870,485 | 1/1959 | Jones | 75—164 |
| 3,069,757 | 12/1962 | Beggs et al. | 29—182.1 |

CARL D. QUARFORTH, *Primary Examiner.*

R. L. GRUDZIECKI, *Assistant Examiner.*